United States Patent [19]

Wakatsuki et al.

[11] Patent Number: 4,487,282
[45] Date of Patent: Dec. 11, 1984

[54] PARKING LOCK SYSTEM FOR THREE-WHEELED VEHICLES

[75] Inventors: Goroei Wakatsuki; Kohei Ohzono, both of Saitama; Masanori Shibuya, Tokyo, all of Japan

[73] Assignee: Honda Giken Kogyo Kabushiki Kaisha, Tokyo, Japan

[21] Appl. No.: 370,532

[22] Filed: Apr. 21, 1982

[30] Foreign Application Priority Data

| Apr. 21, 1981 | [JP] | Japan | 56-60957 |
| Jul. 23, 1981 | [JP] | Japan | 56-116039 |
| Sep. 16, 1981 | [JP] | Japan | 56-145774 |
| Sep. 16, 1981 | [JP] | Japan | 56-137441[U] |

[51] Int. Cl.$^3$ ............ B62D 61/08; B62K 5/04
[52] U.S. Cl. ............................ 180/210; 280/282
[58] Field of Search ......... 180/210, 215, 41, 71; 280/282, 111; 188/109

[56] References Cited

U.S. PATENT DOCUMENTS

| 3,698,502 | 10/1972 | Patin | 280/282 X |
| 4,006,916 | 2/1977 | Patin | 280/282 |
| 4,356,876 | 11/1982 | Watanabe et al. | 188/109 X |
| 4,360,224 | 11/1982 | Sato et al. | 280/282 X |

Primary Examiner—John A. Pekar
Attorney, Agent, or Firm—Irving M. Weiner; Pamela S. Burt; Anthony L. Cupoli

[57] ABSTRACT

A parking lock system for a three-wheeled vehicle having front and rear vehicle bodies interconnected so as to be capable of rolling relative to each other. The parking lock system comprises a first engagement member mounted on one of the vehicle bodies so as to be rollable substantially integrally therewith, and a second engagement member provided for the other of the vehicle bodies so as to be rollable substantially integrally therewith and engageable with the first engagement member in at least one predetermined relative position only, such engagement serving to lock the relative rolling. The system also includes a wheel lock mechanism for locking the rotation of at least one road wheel of the vehicle, a cable member adapted to be pulled to actuate both the second engagement member and the wheel lock mechanism; and an engagement assuring mechanism for assuring the engagement between the first and second engagement members while the cable member is pulled. With such arrangement, both the rolling lock and the wheel lock states can be effected by a smooth operation.

21 Claims, 20 Drawing Figures

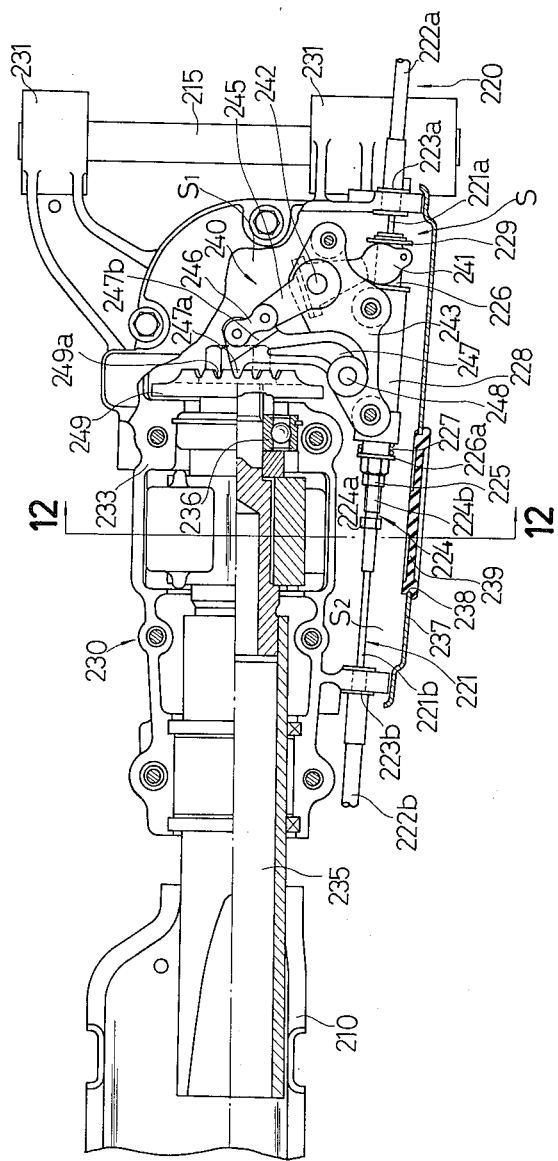

PARKING LOCK SYSTEM FOR THREE-WHEELED VEHICLES

BACKGROUND OF THE INVENTION

1. Field of the Invention

The present invention relates generally to a parking lock system for three-wheeled vehicles. More particularly, the invention relates to a parking lock system for a rolling type three-wheeled vehicle having front and rear vehicle bodies interconnected so as to be rollable relative to each other.

2. Description of Relevant Art

When parking a rolling type three-wheeled vehicle having front and rear vehicle bodies which are interconnected for relative rolling, it is desirable to effect locking of the relative rolling between the front and rear vehicle bodies as well as locking of the rotation of at least one road wheel of the vehicle.

There have been proposed parking lock systems for three-wheeled vehicles which include a rolling lock mechanism for locking relative rolling between front and rear vehicle bodies, a wheel lock mechanism for locking rotation of at least one road wheel, and an operation mechanism for mechanically operating both the rolling lock and wheel lock mechanisms.

In the aforesaid parking lock systems for three-wheeled vehicles, the rolling lock mechanism substantially comprises two members which are mutually engageable for effecting the rolling lock. The two members are respectively joined to either of the front or rear vehicle bodies so as to be rollable integrally therewith. Therefore, the relative positional relation of the two members may become nonaligned with respect to their mutual engagement as a result of possible relative rolling between the front and rear vehicle bodies due to a difference in level of the surface on which the vehicle is parked. In such case, there has heretofore been required an intentional rolling of the front or rear vehicle body, which is a substantially inconvenient and bothersome operation.

The present invention effectively eliminates the aforesaid and related disadvantages attendant conventional parking lock systems for three-wheeled vehicles.

SUMMARY OF THE INVENTION

The present invention provides a parking lock system for a three-wheeled vehicle having front and rear vehicle bodies interconnected so as to be rollable relative to each other. The parking lock system comprises: a first engagement member mounted on one of the vehicle bodies so as to be rollable substantially integrally therewith; a second engagement member provided for the other of the vehicle bodies so as to be rollable substantially integrally therewith and engageable with the first engagement member in at least one predetermined relative position only, such engagement serving to lock the relative rolling; a wheel lock mechanism for locking rotation of at least one road wheel of the vehicle; a cable member adapted to be pulled to actuate both the second engagement member and the wheel lock mechanism; and an engagement assuring mechanism for assuring engagement between the first and second engagement members while the cable member is being pulled.

It is an object of the present invention to provide a parking lock system for three-wheeled vehicles which allows both the rolling lock and the wheel lock to be effected by a single smooth operation.

It is another object of the present invention to provide a parking lock system for three-wheeled vehicles wherein the parking lock operation can be positively performed at a relatively light operating load.

A further object of the present invention is to provide a parking lock system for three-wheeled vehicles capable of achieving the aforesaid objects with a simplified construction and at a relatively low cost.

A still further object of the invention is to provide a parking lock system for three-wheeled vehicles which is constructed so as to be conveniently adjusted and maintained.

The above and other features, objects and advantages of the present invention will become apparent from the following detailed description when read in conjunction with the accompanying drawings.

BRIEF DESCRIPTION OF THE DRAWINGS

FIG. 10 is a side view of a rolling joint in a parking lock system for three-wheeled vehicles in accordance with a second embodiment of the present invention, with a side wall of the rolling joint being opened.

DETAILED DESCRIPTION OF PREFERRED EMBODIMENTS

Figure 1:
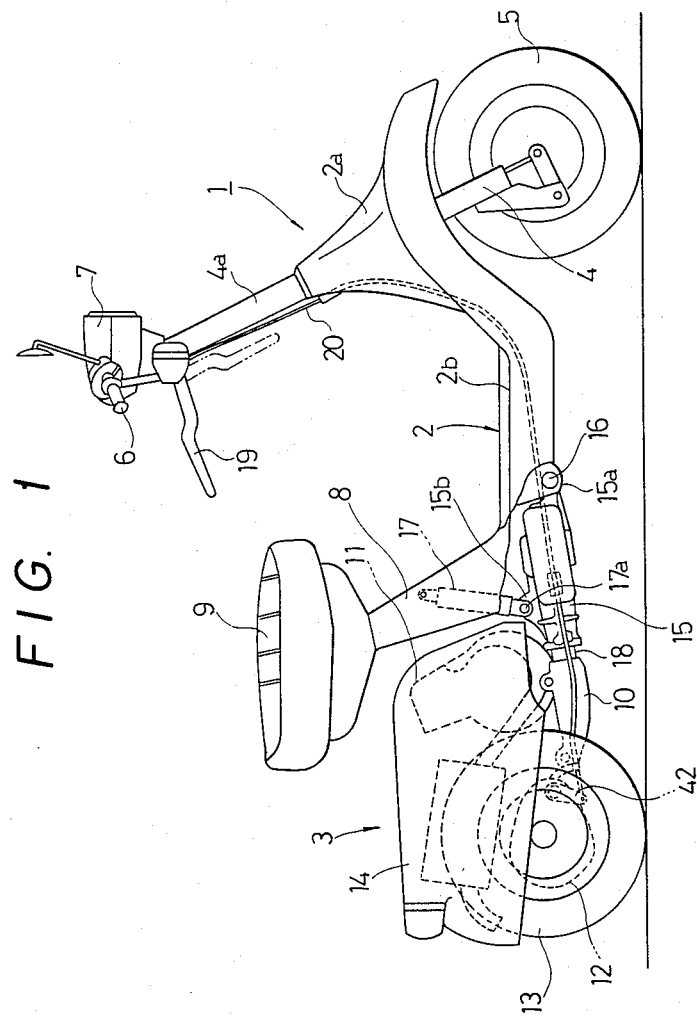
FIG. 1 is a schematic side view of a parking lock system for three-wheeled vehicles in accordance with a first embodiment of the present invention, as applied to a rolling type three-wheeled vehicle.

With reference to FIGS. 1 through 4, a three-wheeled vehicle 1 has a body which is divided into a front vehicle body 2 and a rear vehicle body 3. A single front wheel 5 serving as a steering road wheel is fixed through a front fork 4 to the front portion of the front vehicle body 2, the front fork 4 extending upwardly and being provided at its upper end with a handlebar 6. At an intermediate portion of the handlebar 6 there is mounted a headlight unit 7. A seat post 8, on top of which is mounted a seat 9, extends upwardly from the rear portion of the front vehicle body 2.

An engine 11 is mounted on a rear frame 10 which constitutes a principal part of the rear vehicle body 3, and in linkage therewith there rearwardly extends a transmission case 12, with two rear wheels 13 comprising driving road wheels being disposed on both right and left sides of the transmission case 12. The engine 11 and the case 12 are covered with a cover 14.

A rolling joint 15 is pivoted to a lower portion of the rear of the front vehicle body 2 with a pin 16 through right and left boss portions 15a formed at the front end of the joint 15, thereby permitting the joint 15 to pivot in the vertical direction, or swing, with the pin 16 as a fulcrum. At a rear portion of the joint 15 there is formed an upwardly projecting boss portion 15b to which is pivoted the lower end of a cushion unit 17 with a pin 17a, the upper end of the unit 17 being pivoted at an intermediate portion of the seat post 8. The joint 15 is further provided with a substantially longitudinally extending support shaft 18 which is inclined downwardly in the rearward direction. With the support shaft 18 as an axis, the joint 15 is pivotable to the right and left, i.e., is capable of undergoing a rolling motion with respect to the rear frame 10. Such pivotal movement is suitably cushioned by a Neidhart damper (not shown) mounted on the joint 15 side.

A locking lever 19 is mounted below the central portion of the handlebar 6 and is operated between a parking lock state in its raised position as indicated by a solid line in FIG. 1, and an unlocked state in its lowered position substantially parallel to the front fork 4 as indicated by a dashed line in FIG. 1. The base end portion of the lever 19 is connected to the front end portion of an inner member 20a of an operating cable 20 shown in FIG. 2. As the lever 19 is pulled up to its aforesaid raised position, the cable inner member 20a is pulled. As shown in FIG. 1, cable 20 extends substantially in the direction of the rear wheels 13 along an upper portion 4a of the front fork, a front post portion 2a, a floor 2b, and along the joint 15 and the rear frame 10, and is connected to a parking brake lever 42 for the rear wheels 13.

Figure 2:
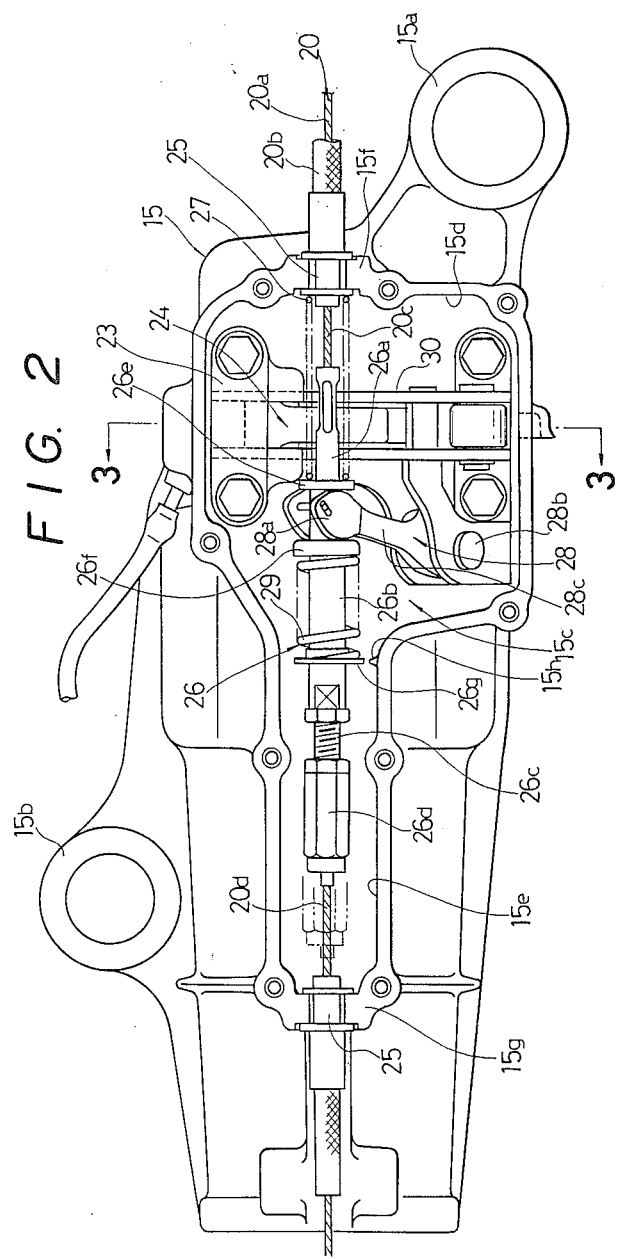
FIG. 2 is an enlarged side view of a rolling joint in the parking lock system of FIG. 1, with a side wall of the rolling joint being opened.
Figure 3:
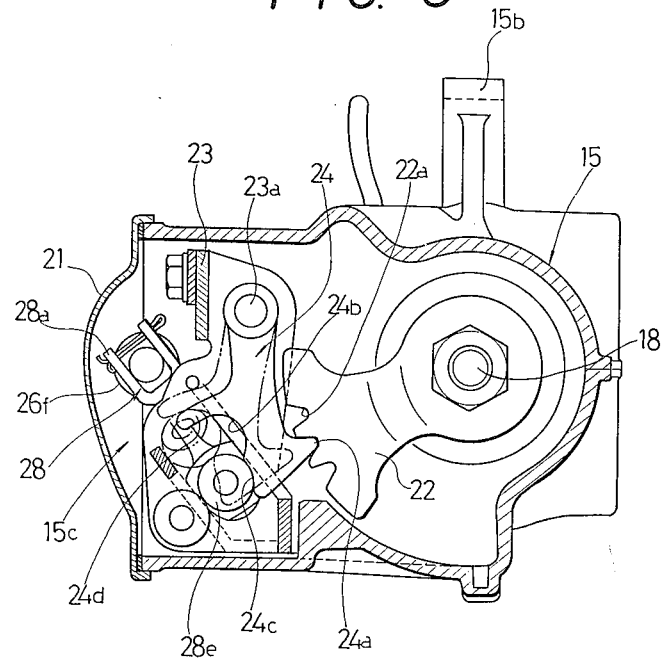
FIG. 3 is a sectional view taken along line 3—3 of FIG. 2.

In one side portion of the joint 15, as shown in FIGS. 2 and 3, the cable 20 is inserted and supported in substantially the longitudinal direction and a concave portion 15c incorporating a locking mechanism is formed and closed with an outside cover 21. A front portion 15d positioned to the right in FIG. 2 from a middle portion of the concave portion 15c is relatively large in the vertical direction, while a rear portion 15e positioned to the left from the middle portion in FIG. 2 is relatively small in the vertical direction but is relatively long in the longitudinal direction. A generally fan-shaped locking plate 22 is mounted on the support shaft 18 at a portion corresponding to the concave portion 15c so as to be substantially orthogonal to the shaft 18, and a plurality of engaging notches 22a are formed at the edge on the concave portion 15c side of the locking plate 22, the notches 22a being formed in the radial direction when viewed from the support shaft 18. An engagement mechanism is provided which includes a support member 23 is fixed to an upper part of the front portion 15d of the concave portion 15c having the locking plate 22, and the base portion of a pawl member 24 serving as an intermediate transmission member is pivoted to the support member 23 with a pin 23a which extends in the same direction as the support shaft 18. The pawl member 24 is pivotable about the pin 23a in a plane substantially orthogonal to the axis of the support shaft 18 and is provided at one side of the lower portion thereof with a pawl 24a adapted to engage with the notches 22a of the locking plate 22 and at the other side with a generally arched notch 24b formed in an oblique lower portion. A pressure cam portion 24c and an unlocking cam portion 24d (both described in greater detail hereinbelow) are formed in the lower and upper portions, respectively, of the notch 24b.

Figure 4:
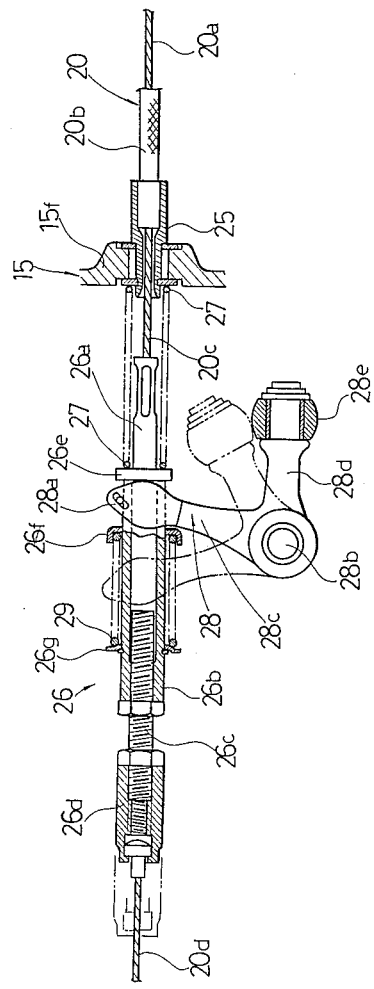
FIG. 4 is a side view for illustrating the operation of a rolling lock actuator in the rolling joint of FIG. 2, with principal portions being partially broken away.

The cable 20 is inserted in the longitudinal direction through a middle portion of the height of the concave portion 15c of the joint 15. Opposed ends of the inserted portion of the cable 20, at which a cable outer member 20b is cut away, are retained respectively through retaining members 25 at a front edge 15f of the front portion 15d of the concave portion 15c and a rear edge 15g of the rear portion 15e thereof and are protected by the cover 21. In the inserted portion of the cable 20 between both the retaining members 25 there extends the inner member 20a in the longitudinal direction through the concave portion 15c. As shown in FIG. 4, the portion of the inner member a facing the concave portion 15c is divided into a front portion 20c and a rear portion 20d, which are connected through an adjuster 26, thereby defining substantially a single line member. The adjuster 26 comprises a rod 26a of a relatively small diameter connected to the front portion 20c of the inner member 20a, a tubular member 26b of a relatively large diameter integral with the rod 26a, and a connector 26d connected at one end thereof to the rear end of the tubular member 26b through an adjusting screw 26c and at the other end thereof to the rear portion 20d of the inner member 20a, whereby the length of the inner member 20a is made adjustable. Positioning is effected with a tally mark 15h (FIG. 2) affixed to the rear portion 15e. A flange 26e is fixed to the rod 26a and a return spring 27 is disposed between the front face of the flange 26e and the edge 15f of the concave portion 15c in such a manner that it surrounds the cable inner member 20a and the rod 26a. A bifurcated portion 28a formed at the tip end of a generally L-shaped actuator 28 is loosely fitted over the outer periphery of the tubular member 26b so that its front end is restrained by the flange 26e, while its rear end side faces the front face of a slide flange 26f which is slidably fitted over the outer periphery of the tubular member 26b. A relief spring 29 is disposed between the back of the flange 26f and a stopper 26g fixed to a rear portion of the tubular member 26b.

A central bent portion of the L-shaped actuator 28 is pivoted with a pin 28b to a support member 20 which is positioned at the middle portion of the front portion 15d of the concave portion 15c. The pin 28b is disposed in the right and left direction below and in nearly orthogonal relation to the cable 20, so that an arm 28c extends substantially in the direction of the cable and the other arm 28d extends substantially in the same direction as the cable in orthogonal relation to the pin 28b. At the tip end portion of the arm 28d there is mounted a cam roller 28e capable of rolling, the cam roller 28e being engaged with the notch 24b of the pawl member 24, as shown in FIG. 3.

Before the cable 20 is pulled, i.e., before the parking lock operation, the pawl member 24 and the actuator 28 are in the respective positions thereof indicated by dashed lines in FIGS. 3 and 4. As the cable 20 is pulled, the rod 26a and the tubular member 26b moves forwardly against the spring 27, and the actuator 28 which is in engagement therewith through its tip end portion 28a moves pivotally in a clockwise direction in FIG. 4 about the pin 28b as a fulcrum. In this case, the movement in the same direction as the cable of the tip end portion 28a, which causes such pivotal movement, is effected by the slide flange 26f which is urged by the spring 29. The roller 28e moves downwardly along the notch 24b of the pawl member 24 and comes into engagement with the lower pressure cam 24c, thereby allowing the pawl member 24 to pivot about the pin 23a as a fulcrum in a counterclockwise direction in FIG. 3, i.e., in the inside direction in which the locking plate 22 is disposed, and allowing the pawl 24a to engage any one of the notches 22a. Thus, the locking plate 22 is locked by its engagement with the pawl member 24 to prevent rotation of its support shaft 18 and consequently a swing motion is prevented.

If the pawl 24a lies on a land portion other than the notches 22a, the pivotal movement in the aforesaid locking direction of the pawl member 24 is prevented, thus causing the actuator 28 to stop in an intermediate position between the dashed and solid lines in FIG. 4. However, the rod 26a and the tubular member 26b move forwardly against the spring 29, so that the spring 29 is compressed and pushes the tip end portion 28a of the actuator 28 at a high spring load. The spring 29 acts as a relief element and the cable inner member 20a can continue its stroke even if the actuator 28 is locked in an intermediate position, thus allowing a wheel locking operation as will be described hereinbelow to be performed without any difficulty.

The actuator 28 is urged in the locking direction as previously described, so that when the support shaft 18 rolls to the right and left, the pawl 24a faces any one of the notches 22a and an engagement therebetween is effected by virtue of a bias of the spring 29.

When unlocking, the cable inner member 20a returns in the direction of its original position by being urged by the spring 27, the actuator 28 pivots in the opposite direction, and the roller 28e pushes up the upper unlocking cam portion 24d to move the pawl member 24 pivotally in a clockwise direction in FIG. 3, thus causing the pawl 24a to be disengaged from the notch 22a with which it was in engagement and return to the position indicated by dashed line.

Figure 5:
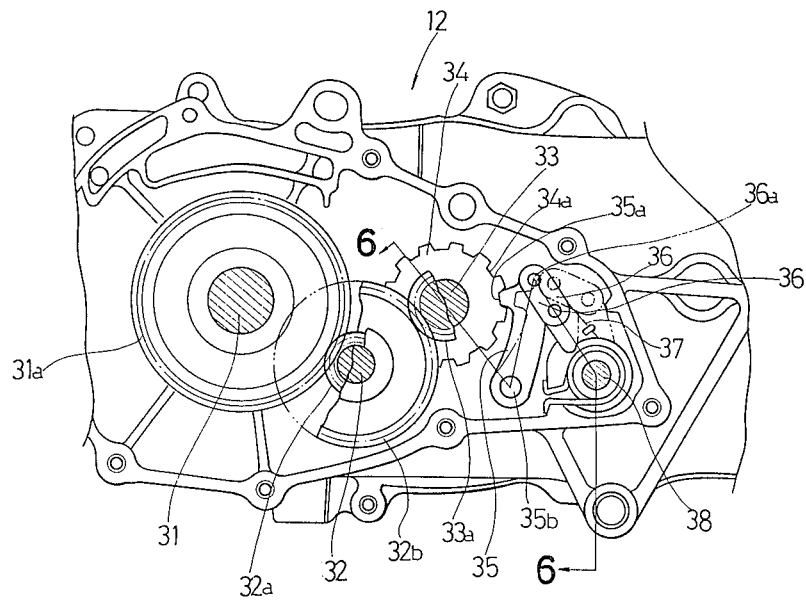
FIG. 5 is an enlarged side view of a wheel lock mechanism in the parking lock system of FIG. 1.
Figure 6:
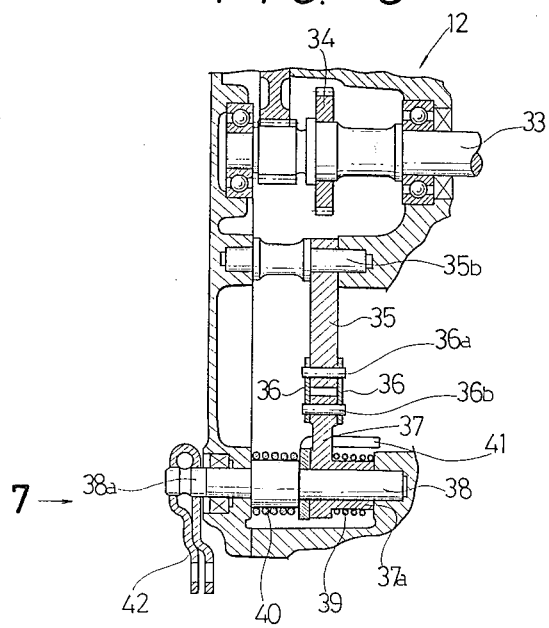
FIG. 6 is a sectional view taken along line 6—6 of FIG. 5.
Figure 7:
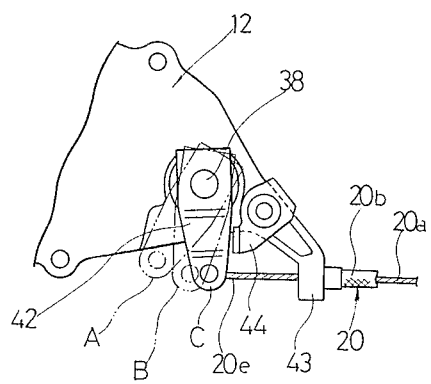
FIG. 7 illustrates an operating cable connection as viewed from the direction of arrow 7 in FIG. 6.

Referring now to FIGS. 5 through 7, there is shown the transmission case 12, in which a gear 31a mounted on one side of a final shaft 31 for driving the rear wheels 13 is in meshing engagement with a gear 32a of a relatively small diameter mounted on an intermediate shaft 32, and a gear 32b of a relatively large diameter mounted on the intermediate shaft 32 is in meshing engagement with a gear 33a of a relatively small diameter mounted on an adjacent shaft 33. Also mounted on the shaft 33 is a stopper gear 34 of a relatively large diameter, and a locking member 35 having a pawl 35a is disposed adjacent the stopper gear 34 so as to be pivotable about a lower pin 35b. The locking member 35 is pivoted at its upper portion to one end of a link 36 through a pin 36a, the other end of the link 36 being pivoted by a pin 36b to the tip end of an arm 37, and the base end portion of the arm 37 is pivoted to a part of the case 12 through a pin 38. The pin 38 and the arm 37 are connected by a relief spring 39 which is wound around a tubular boss portion 37a formed at the base portion of the arm 37. A return arm 41 urged by a return spring 40 is mounted so as to interfere with the arm 37, and one end of the parking brake lever 42 is fixed to an extending end 38a of the pin 38, while the other end of the lever 42 is connected to a rear end portion 20e of the cable inner member 20a. A supporting stay 43 is provided for the end portion of the cable outer member 20b, and a stopper 44 is provided for the lever 42.

Figure 8:
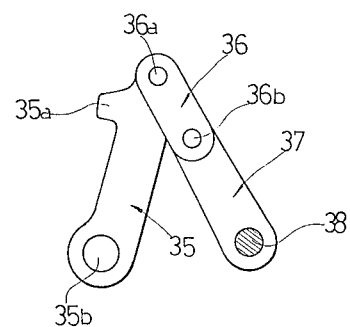
FIGS. 8 and 9 illustrate the operation of a linkage in the wheel lock mechanism of FIG. 5.
Figure 9:
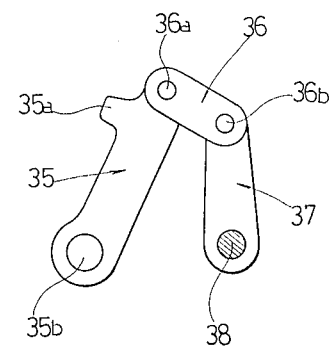

In the above arrangement, while the cable 20 is not being pulled, the locking member 35, the link 36 and the arm 37 define a convex type toggle link mechanism as is shown in dashed line in FIG. 5, i.e., a construction such as shown in FIG. 9 is obtained, in which the member 35 is retreated and the pawl 35a is disengaged from a root 34a of the gear 34. In this state, if the parking lock operation is performed and the cable inner member 20a is thereby pulled, the arm 37 pivots in a counterclockwise direction in FIG. 9 through the spring 39, thus causing the link 36 to move downwardly, and the member 35 also pivots in a counterclockwise direction in FIG. 9, so that the arm 37 and the link 36 are arranged in the form of a straight line as shown in FIG. 8 and the pawl 35a moves in to engage the root portion of the gear 34. In this manner, the rear wheels 13 are brought into the state shown in solid line in FIG. 5, i.e., the state of FIG. 8.

Because the toggle mechanism is used in the above-described construction, only a small operating load is required and the engagements are ensured. In case the pawl 35a contacts a land portion of the gear 34, the lever 42 is pivotally moved from a non-operative position A to a lock end position B in FIG. 7 by the relief action of the spring 39, and the gear 34 and hence the rear wheels 13 are pivoted back and forth by virtue of the load of the spring 39. In the position wherein the root 34a of the gear 34 and the pawl 35a are opposed to each other, the member 35 pivots in the engaging direction until the locking is effected by the engagement. Even if the cable 20 is further pulled, the lever 42 can move up to a position C in FIG. 7 by virtue of the relief action of the spring 39. Therefore, even when the cable 20 is pulled to excess, the excessive pulling is effectively absorbed by such relief action.

Upon removal of the pulling load on the cable 20, the return arm 41 moves the arm 37 back to its original position by the return action of the spring 40, thereby causing the member 35 to pivot in a clockwise direction in FIG. 8 to disengage the pawl 35a from the root 34a.

From the foregoing description it will be readily understood that the rolling lock and wheel lock, as well as release of such locks, in a three-wheeled vehicle can be effected with a single cable 20, i.e., with a single input system.

Figure 11:
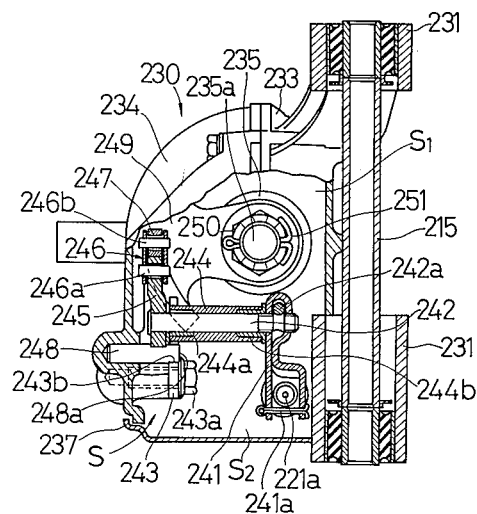
FIG. 11 is a front view of the rolling joint of FIG. 10, with principal portions being partially broken away.
Figure 12:
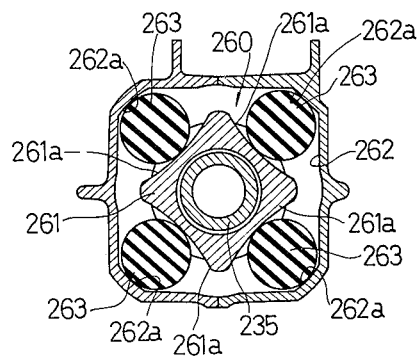
FIG. 12 is a sectional view taken along line 12—12 of FIG. 10.
Figure 13:
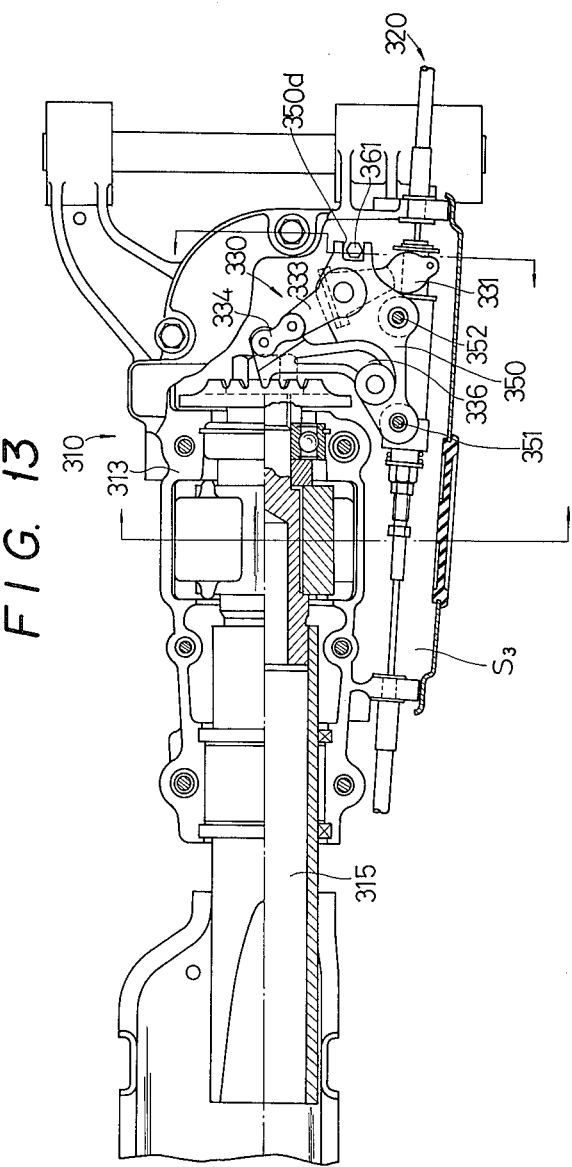
FIG. 13 is a longitudinally sectioned plan view of a rolling joint in a parking lock system for three-wheeled vehicles in accordance with a third embodiment of the present invention.
Figure 14:
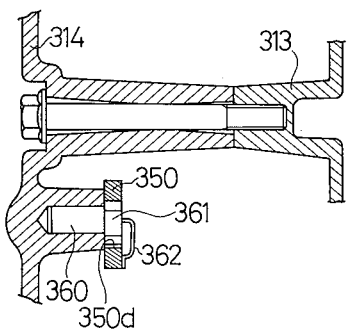
FIG. 14 is a sectional view taken along line 14—14 of FIG. 13.
Figure 16:
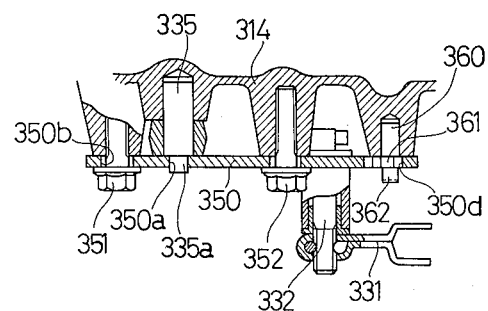
FIG. 16 is a longitudinally sectioned side view of a movable bracket portion in the lock mechanism of FIG. 15.
Figure 15:
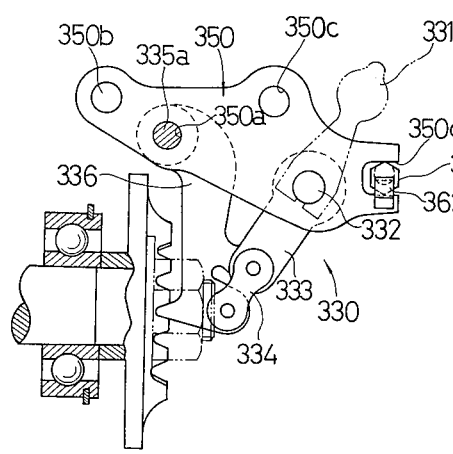
FIG. 15 is a bottom view of a principal part of a rolling lock mechanism in the rolling joint of FIG. 13.
Figure 17:
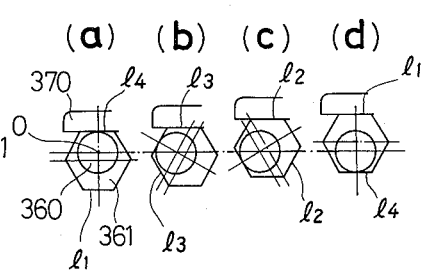
FIGS. 17(a) through (d) illustrate adjusting stages for positioning the bracket portion of FIG. 16.

With reference now to FIGS. 10 through 12, there is shown a parking lock system in accordance with a second embodiment of the present invention, in which reference numeral 230 designates a rolling joint corresponding substantially to the joint 15 in the first embodiment. The joint 230 is accommodated within a joint case comprising a superposed joined body of a lower case 233 and an upper case 234, and in the central portion thereof there is inserted a support shaft 235 in the longitudinal direction through a bearing 236, the support shaft 235 being fixed at its base portion to a rear frame 210, whereby the joint 230 is made pivotable to the right and left, i.e., is capable of rolling, about the support shaft 235. Boss portions 231 are formed on both sides of the front end of the joint 230, and through a pin 215 disposed between the boss portions 231 the joint 230 is swingably connected to the rear portion of a front vehicle body of, for example, a three-wheeled vehicle such as shown in FIG. 1.

In the front portion of the joint 230 ahead of the support shaft 235 there is formed a space $S_1$ which is relatively long in the right and left direction, and in one side of the joint 230 there is formed a space $S_2$ which is relatively long in the longitudinal direction. The spaces $S_1$ and $S_2$ communicate with each other to form a single space S in which is accommodated a parking lock interlocking mechanism as will be described hereinbelow. Outside the space $S_2$ there is removably mounted a cover 237 by means of bolts or the like, whereby not only the protection of the parking lock interlocking mechanism is attained but also adjustment and maintenance of such mechanism is facilitated. The cover 237 has a window portion 238 in which is removably fitted a cap 239 by means of a grommet or the like. By removing the cap 239, adjustment, maintenance, etc. of the interior parking lock interlocking mechanism can be performed directly, without requiring removal of the cover 237 from the body of the joint 230.

It will be understood that the space S formed within the joint 230 thus comprises a closed space, which prevents entry of dust or the like from the ambient.

Mounted on a front portion of the support shaft 235 is a cam 261 having a generally square-shaped cross section, as shown in FIG. 12, and a tubular inner wall 262 also having a generally square-shaped cross section is formed in surrounding relation with respect to the cam 261. An elastic body 263, formed of rubber for example, is interposed between each of the four corners 262a of the tubular inner wall 262 and each of the four sides 261a of the cam 261 to thereby constitute a Neidhart damper 260. The pivotal movement of the front vehicle body about the support shaft 235, or a rolling motion, is cushioned by an elastic flexing action of the elastic bodies 263.

An operating cable 220 is inserted and supported in the longitudinal direction in the lower portion of the space $S_2$ of the rolling joint 230 and includes outer members 222a and 222b which are separated in the front and rear by being separated in a portion of the space S. The outer members 222a and 222b are fixed to front and rear walls of the lower case 233 by means of retaining members 223a and 223b, respectively. In a portion of the space S there extends a cable inner member 221 which comprises front and rear inner members 221a and 221b connected to each other. The front end of the rear-side inner member 221b is connected to the rear end of a rod 224, a nut portion 224a is formed on a rear part of the rod 224 and an externally threaded portion 224b is formed ahead of the nut portion 224a, thereby making the length adjustable. To the front end of the rod 224 there is connected (not shown) the rear end of the front-side inner member 221a. On the externally threaded portion 224b of the rod 224 there are fitted a lock nut 225 and a pipe 226 having a flange portion 226a formed at the rear end thereof, and on the outer periphery of the pipe 226 there is loosely fitted an indicator 228, formed of a pipe material of a relatively large diameter, through a coiled spring 227. A ring 229 is fixed to the front end portion of the pipe 226.

The front end face of the pipe 226 is closed, leaving a hole for insertion therethrough of the front-side inner member 221a, and the indicator 228 not only functions to visually show the stroke of the pipe 226 when the inner member 221 is pulled, but also serves as a guide for the coiled spring 227.

A swing arm 241 which comprises a link mechanism 240 disposed within the front space $S_1$ of the rolling joint 230 is in engagement with a front portion of the pipe 226 between the front face of the indicator 228 and the ring 229. The swing arm 241 is formed of two sheets of metallic plate bent at the base portion and bonded at an approximately intermediate portion, and includes a tip end portion bifurcated in substantially the vertical direction to thereby loosely hold the front portion of the pipe 226 and engage between the front face of the indicator 228 and the ring 229. Such engagement is ensured by a cotter pin 241a inserted between the bifurcated tip end portions of swing arm 241. The base or bent portion of the swing arm 241 is fitted by serration engagement on the lower portion of a shaft 242 which extends downwardly from the upper case 234, and between a reduced diameter portion formed at the lower portion of the shaft 242 and the bent portion of the swing arm 241 there is inserted a pin 242a which is set transversely with respect to the shaft 242. The shaft 242 is inserted lengthwise into a collar 244 which is suspended lengthwise from the front portion of a bracket 243, the bracket 243 being suspended sideways from the upper case 234 and being relatively long in the longitudinal direction. Bushings 244a and 244b are press-fitted in the upper and lower ends, respectively, of the collar 244, whereby the shaft 242 is made rotatable. The bracket 243 is fixed with three bolts 243a to an upper inner wall of the upper case 234. The upper portion of the shaft 242 is press-fitted into the base portion of a link plate 245. The plate 245 extends in the direction of the support shaft 235, and one end of a chain link 246 is pivotably supported by a pin 246a at the tip end portion of plate 245. A stopper 247 is mounted sideways on a rear portion of the bracket 243 by means of a pin 248. The upper end of the pin 248 is press-fitted into an upper inner wall of the upper case 234, and at the lower end of the pin 248 is formed a reduced diameter portion 248a which is fitted in a small hole 243b formed in a rear portion of the bracket 243. Thus, the stopper 247 is pivoted between the upper case 234 and the bracket 243.

The stopper 247 comprises an arm-like member with the base portion thereof facing from above the bracket 243 and with the tip end portion thereof facing toward the front end of the support shaft 235. On the front side of such tip end portion there is pivotably supported the other end of the chain link 246 by means of a pin 246b. At the rear side of such tip end portion, i.e., at the portion thereof opposed to the front end face of the support shaft 235, there is formed a pawl 247a which is generally triangular in plan, the pawl 247a engaging one of radial grooves 249a formed in the outer peripheral portion of the front end of a generally fan-shaped stopper plate 249 which is fixed to the front end face of the support shaft 235.

The stopper plate 249 is fitted at its base portion on an externally threaded portion 235a of a relatively small diameter which projects from the front end face of the support shaft 235, and is substantially in the form of an upwardly divergent fan. A nut 250 is threadedly fitted on the external thread 235a. Such fixed state is ensured by a cotter pin 251.

The stopper 247 is provided at its front portion near its tip end with an abutting portion 247b adapted to abut a side of the plate 245 to prevent the plate 245 from further pivoting, whereby during engagement of the pawl 247a with the groove 249a the plate 245 and the chain link 246 are positioned on a substantially straight line.

Described hereinbelow are the rolling lock and unlocking operations of a parking lock system in accordance with the second embodiment of the present invention.

When the locking lever is in its lowered position as indicated by the dashed line in FIG. 1, i.e., in the normal state before performing the parking lock operation, the inner member 221 of the cable 220 is not pulled and the connection of the inner member 221 comprising the wheel lock mechanism disposed within the space $S_2$ formed at one side of the rolling joint 230 is in a position which is retreated further than the position shown in FIG. 10.

When the locking lever is raised up, the inner member 221 is pulled, so that the front face of the indicator 228 which advances together with the inner member 221 pushes the swing arm 241 which comprises the link mechanism 240, thus causing the swing arm 241 to pivot counterclockwise in FIG. 10 about the shaft 242. Along with such pivotal movement of the swing arm 241, the plate 245 press-fitted on the upper portion of the shaft 242 also pivots counterclockwise about the shaft 242, so that the side near the tip end portion of the plate 245 comes into abutment with the abutting portion 247b of the stopper 247. As the inner member 221 is further pulled, the stopper 247 pivots counterclockwise about the pin 248 and the pawl 247a formed at its tip end portion engages one of the grooves 249a.

Along with the pivotal movement of the stopper 247, the chain link 246 pivots about its pivoted portion with respect to the plate 245, i.e., about the pin 246a while being pulled by the pin 246b. At this time, the plate 245 and the chain link 246 are held on substantially a straight line.

In case the pawl 247a abuts a land portion between two adjacent grooves 249a, by somewhat rolling the vehicle body, the pawl 247a will positively come into engagement with either of the grooves 249a.

In the foregoing manner, the rolling lock for the joint 230, i.e., the rolling lock for the vehicle body, is effected. In this case, the locking lever does not yet reach its final raised position, for example, as shown in FIG. 1. Before the locking lever reaches such final position, the front face of the flange portion 226a of the pipe 226 disposed within the space $S_2$ and the coiled spring 227 disposed within the indicator 228 move beyond the respective positions shown in FIG. 10 in the direction of further compression as the inner member 221 is pulled.

In other words, along with the stroke to the final raised position of the locking lever, the inner member 221 is further pulled, so that the pipe 226 advances as if the indicator 228 were the fixed side and the ring 229 fixed to the front end of the pipe 226 moves away from the swing arm 241, while the pulling force of the inner member 221 is absorbed by the coiled spring 227. The resilient force of the compressed coiled spring 227 is thus allowed to be exerted on the link mechanism 240 within the space $S_1$ to thereby ensure the locked state against rolling. At the same time, the inner member 221 pulls the braking arm of the parking brake for the rear wheels to thereby ensure operation of the wheel lock.

In this embodiment, the link mechanism 240 is adopted as a rolling lock mechanism for the joint 230, and the engagement and locking for the support shaft 235 are effected from the axial direction of the support shaft 235. Further, the chain link 246 and the plate 245 are positioned on an approximately straight line in the locked state. As a result, external forces acting about the support shaft 235 in the locked state are absorbed by the pivotal movement of the stopper 247 and that of the chain link 246 respectively through the pin 248 on which the stopper 247 fits loosely and the pins 246a and 246b on which the chain link 246 fits loosely. External forces acting in the axial direction of the support shaft 235 are also absorbed by the pivotal movement of the stopper 247 and that of the chain link 246. Therefore, the inner member 221 will never be subjected to an excessive force.

While preventing reaction forces from being transmitted to the inner member 221 in the above manner, the state of engagement between the pawl 247a of the stopper 247 and the groove 249a of the stopper plate 249 can be maintained by virtue of the resilient force of the coiled spring 227 while allowing the plate 245 to push the abutting portion 247b of the stopper 247. Therefore, locking of the rolling for the vehicle body is ensured, whereby it is made possible to prevent operation of the Neidhart damper 260 during the parking lock state and to prolong the service life of such damper.

Moreover, because there is no influence upon the inner member 221 of the operating cable 220 for operating the wheel locking mechanism, both the wheel locking mechanism and the vehicle body locking mechanism may be interlocked with each other, and with such construction the parking lock state can be effectively attained.

The parking lock state as described hereinabove is released by returning the locking lever to its lowered position, for example, as shown in FIG. 1. Once the locking lever is thus operated, the inner member 221 moves back to release the locked state of the wheels and the pipe 226 moves back within the space $S_2$ of the joint 230, so that the ring 229 mounted on the front end of the pipe 226 forces back the swing arm 241, thus allowing the latter to pivot clockwise about the shaft 242. Accordingly, the plate 245, the chain link 246 and the stopper 247 also move pivotally in a clockwise direction, whereby the pawl 247a of the stopper 247 is disengaged from the groove 249a of the stopper plate 249.

Referring now to FIGS. 13 through 17, there is shown a parking lock system according to a third embodiment of the present invention, wherein reference numeral 310 designates a rolling joint corresponding substantially to the joint 230 in the second embodiment. The rolling joint 310 is accommodated within a joint case comprising a superposed joined body of a lower case 313 and an upper case 314. Within the interior space $S_3$ of the joint case there is inserted a cable 320 in the longitudinal direction, the cable 320 being connected to a locking lever of a three-wheeled vehicle such as shown in FIG. 1. Also disposed in the space $S_3$ is a rolling lock mechanism 330 comprising links 331 and 333 which are pivoted by the cable 320, a chain link 334 connected thereto, a stopper 336 and a bracket 350. When parking the three-wheeled vehicle, a support shaft 315 is locked in its axial direction by pulling the cable 320 to thereby prevent rolling, and when starting the vehicle the cable 320 is loosened to release the locked state.

The bracket 350 is suspended from the upper case 314 at two points, i.e., at its rear and middle portions, by means of bolts 351 and 352, respectively. The diameter of holes 350b and 350c for insertion therethrough of the bolts 351 and 352 is formed in advance to be larger than the diameter of the bolts. In a front end portion of the bracket 350 there is formed a notched portion 350d which is open forwardly. The notched portion 350d has a sufficient width to allow rotation of a polygonal head 361 of an adjusting pin 360 as will be described hereinbelow. The adjusting pin 360 is fitted in the upper case 314 while its upper portion is loose and its polygonal head 361, which is hexagonal in this embodiment, is eccentric and faces the notched portion 350d of the bracket 350.

The adjusting pin 360 is inserted in the upper case 314 from below, and in order to maintain its inserted state, a flexible metallic piece 362 is fixed by welding or other means to the peripheral edge of the notched portion 350d of the bracket 350. The metallic piece 362 is bendable at its base portion by virtue of its flexibility and its tip portion abuts the lower end face of the head 361 of the adjusting pin 360 to positively prevent the adjusting pin 360 from coming off. Because the metallic piece 362 is flexible and bendable, the positioning as will be described hereinbelow can be effected easily.

The amounts of stepwise adjustment afforded by the adjusting pin 360 having the polygonal head 361 which is rendered eccentric are shown in FIGS. 17(a)-(d). The head 361 is hexagonal as described above, and its six sides comprise a side $l_1$ having the greatest amount of eccentricity, a side $l_4$ which is an opposite side with respect to the side $l_1$ and which has the least amount of eccentricity, a side $l_2$ which is adjacent to the side $l_1$ and which has the second greatest amount of eccentricity and a side $l_3$ which is adjacent to the side $l_4$ and which has the third greatest amount of eccentricity. As is apparent from FIGS. 17(a)-(d), four stages of fine positioning adjustments can be made with respect to a movable member 370.

If the state in which the side $l_4$ having the least amount of eccentricity abuts the movable member 370 as shown in FIG. 17(a) is assumed to correspond to a rotational angle of 0° about a center 0 of the adjusting pin 360, then the state in which the adjusting pin 360 has been rotated counterclockwise by 60° is as shown in FIG. 17(b), the state of 120° rotation in the same manner is as shown in FIG. 17(c) and the state of 180° rotation is as shown in FIG. 17(d). Thus, four stages of adjustments having different amounts of adjustment can be performed.

Because the adjusting pin 360 itself is in a loosely fitted state with respect to the fixed member as described above, the operation for rotational adjustment of the adjusting pin 360 may be performed directly by hand or by using a tool such as a spanner, or by forming an optional slot in the head and using a square wrench or a similar tool which engages with the slot. Further, although the head 361 is hexagonal in this embodiment, its shape is not limited thereto, i.e., the head 361 may have any polygonal shape, provided the polygon has a side capable of making surface contact with the movable member 370.

Positioning adjustment is made so that the link 333 and chain link 334 comprising the link mechanism 330 are positioned on an approximately straight line by rotating the eccentric polygonal head 361 of the adjusting pin 360 which faces the interior of the notched portion 350d of the bracket 350.

The bracket 350 is movable because the holes 350b and 350c formed in its rear and middle portions are larger in diameter than the bolts 351 and 352. Further, bracket 350 has a small hole 350a formed in a position near its rear portion, in which hole is fitted a reduced diameter portion 335a formed at the lower end of a pin 335 which is press-fitted in and suspended from the upper case 314 as the fixed member. Therefore, along with rotation of the adjusting pin 360, the bracket 350 is pivotable with the small hole 350a as a fulcrum while being guided by the sides of the head 361. At this time, along with the pivotal movement of the bracket 350, the link mechanism 330 also pivots because a shaft 332 which integrally connects the links 331 and 333 is rotatably supported at the front portion of the bracket 350.

When the link 333 and the chain link 334 have been positioned on a straight line by the above-described positioning operations, a simplified and certain positioning is made possible by bending the metallic piece 362 and bringing it into abutment with the lower surface of the head 361 of the adjusting pin 360 and then tightening the bolts 351 and 352 to fix the bracket 350 integrally to the upper case 314.

The polygonal head 361 of the adjusting pin 360 is in surface contact with the notched portion 350d of the bracket 350, so that even if the bolts 351 and 352 become loose and a reaction force caused by pulling the cable 320 is exerted on the bracket 350 through the link mechanism 330, the engagement for rolling lock and release thereof can be positively effected.

According to this embodiment, therefore, the bracket 350 as a movable member can be finely adjusted stepwise with respect to the upper case 314 as a fixed member by means of the adjusting pin 360 having the eccentric polygonal head 361. Because the head 361 of the adjusting pin 360 is in the form of a polygon, the contact between each side of the polygon and the movable member is ensured and the movable member can be positively supported by its surface contact with each side of the polygon.

Further, the adjusting pin 360 itself has no threaded portion, so that its rotation is very easy and inconveniences such as overtightening, as may occur if a bolt or the like is employed, are avoided.

Figure 18:
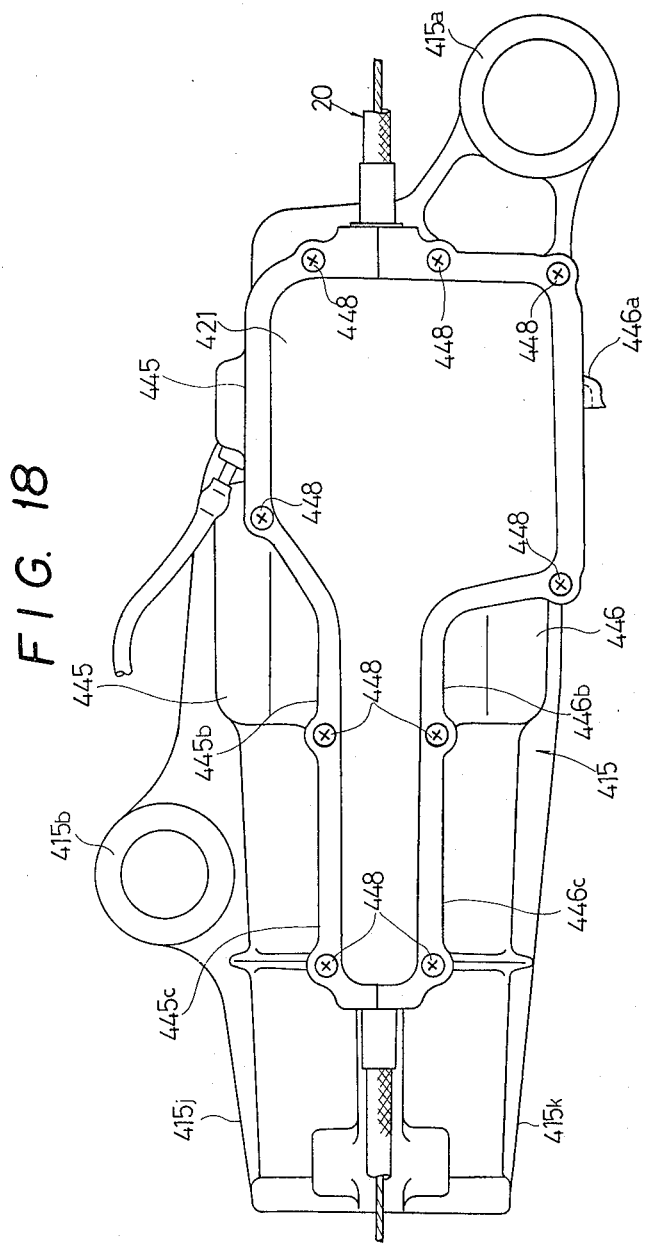
FIG. 18 is a side view of a rolling joint in a parking lock system for three-wheeled vehicles in accordance with a fourth embodiment of the present invention.
Figure 19:
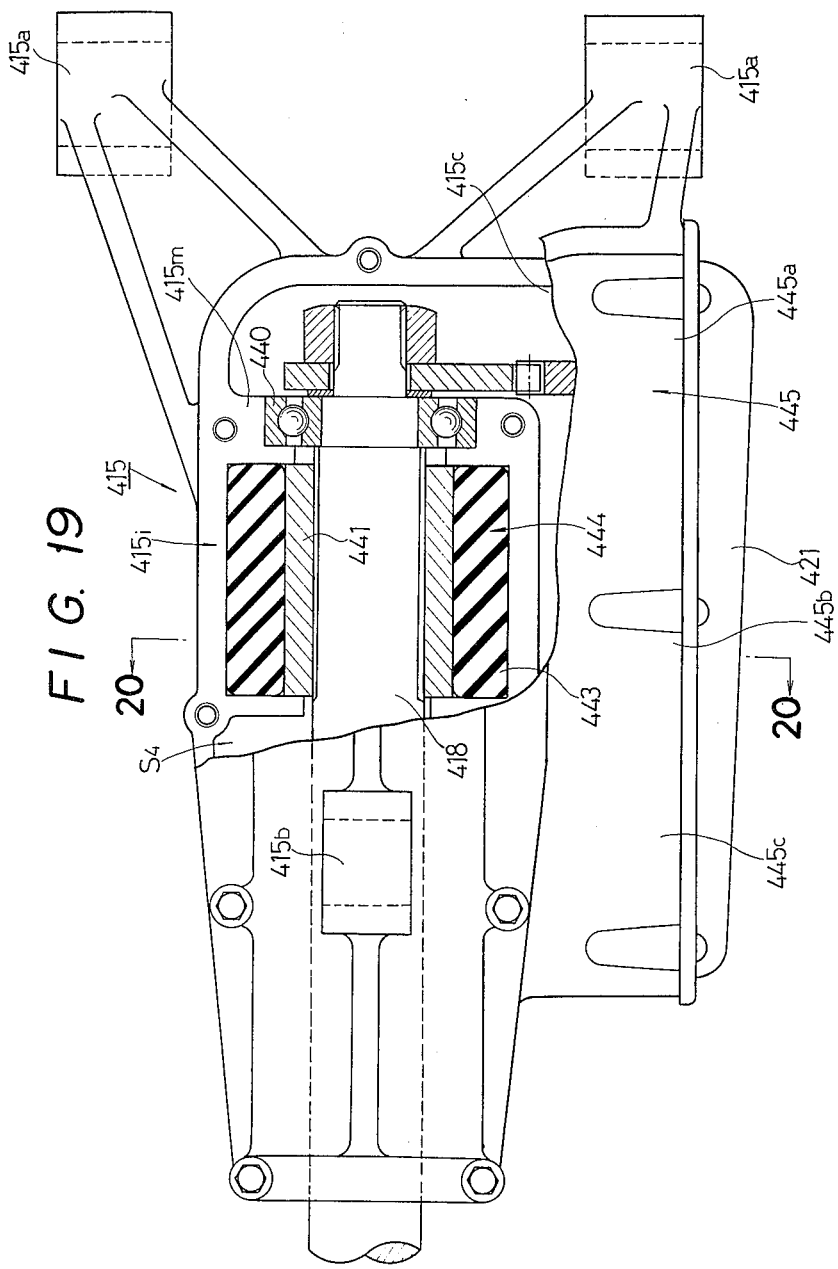
FIG. 19 is a plan view of the rolling joint of FIG. 18, with principal portions being partially broken away.
Figure 20:
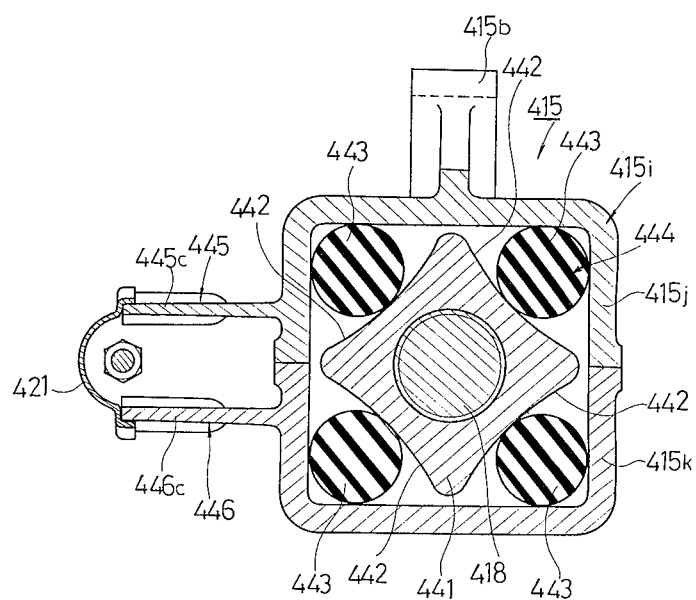
FIG. 20 is a sectional view taken along line 20—20 of FIG. 19.

With reference now to FIGS. 18 through 20, there is shown a parking lock system in accordance with a fourth embodiment of the present invention, wherein reference numeral 415 designates a rolling joint corresponding substantially to the joint 230. The joint 415 is provided with a joint case 415i, the joint case 415i comprising a superposed joined body of upper and lower halves 415j and 415k which are long in the longitudinal direction, i.e., in the axial direction of the joint 415. Within the case 415i is formed an axial space $S_4$ which is closed at its front end and is open in its rear. Inserted within the space $S_4$ is a longitudinally extending support shaft 418 which is fixed at one end thereof to a rear frame (not shown), with its tip end portion being supported on a bearing portion 415m through a bearing 440. Thus, the support shaft 418 is fixed with respect to the rear frame, while the case 415i is pivotable about the support shaft 418. In this manner, a front vehicle body (not shown), connected for swinging motion to the joint 415, is connected to a rear vehicle body (not shown) so as to be capable of rolling. A cam 441 having a generally square-shaped cross section is mounted on the support shaft 418 in a position near the tip end portion of the support shaft 418, and between four sides 442 of the cam 441 and four corners of the inner wall of the space $S_4$ there are disposed elastic bodies 443, formed of rubber for example. By virtue of the elastic flexibility of the elastic bodies 443 there is formed a Neidhart damper 444 to cushion the rolling of the front vehicle body.

The joint 415 is further provided at right and left sides of its front end with boss portions 415a, and through a pin (not shown) disposed therebetween the joint 415 is connected for swinging motion to the front vehicle body. Through a boss portion 415b formed on the upper side of the central part of the joint 415 and further through a pin (not shown) fitted therein, the joint 415 is pivotably connected to the lower end of a shock absorber (not shown), the upper end of which is pivoted, for example, to the central part of a seat post (not shown).

In one side portion of the case 415i of the joint 415 there is inserted a locking cable 420 in the longitudinal direction. The cable 420 is surrounded by a space 415c which is defined by bulged side walls 445 and 446 of the upper and lower halves 415j and 415k of the case 415i. The side walls 445 and 446 comprise front portions 445a and 446a which are relatively long in the vertical direction, middle portions 445b and 446b and rear portions 445c and 445b, the middle and rear portions being relatively short in the vertical direction. The space 415c defined by the side walls 445 and 446 communicates with the space $S_4$ and a locking mechanism is accommodated therein.

Further, the outside of the space 415c is closed and protected by a cover plate 421 which is removably secured to the side walls 445 and 446 by means of machine screws 448.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A parking lock system for a three-wheeled vehicle having front and rear vehicle bodies interconnected so as to be capable of rolling relative to each other, comprising:
    a rolling shaft secured at one end thereof to said rear vehicle body and rotatably fitted at the other end thereof in said front vehicle body;
    a first engagement member secured to said rolling shaft so as to be rollable substantially integrally therewith;
    an engagement mechanism provided for said front vehicle body so as to be rollable substantially integrally therewith and having a second engagement member;
    said engagement mechanism being engageable with said first engagement member in at least one predetermined relative position only, said engagement causing said relative rolling to be locked;
    a wheel lock mechanism for locking rotation of at least one road wheel of said vehicle;
    an operation element;
    a substantially continuous single cable member interconnecting said operation element with said wheel lock mechanism so as to actuate said wheel lock mechanism upon operation of said operation element; and
    said engagement mechanism being directly connected to said cable member so as to be actuated upon the operation of said operation element.

2. A parking lock system according to claim 1, wherein:
    said engagement mechanism comprises a pivotable mechanism adapted to actuate said second engagement member, and a spring member connected at one end thereof with said cable member and at the other end thereof with said pivotable mechanism.

3. A parking lock system according to claim 2, wherein:
    said pivotable mechanism comprises a substantially L-shaped link member pivoted at an intermediate portion thereof; and
    said link member has one end thereof connected with said spring member and the other end thereof slidably contacting said second engagement member.

4. A parking lock system according to claim 3, wherein:
    said second engagement member comprises a pivotable plate having on one side thereof a recess portion following said link member and on the opposite side thereof a pawl portion engageable with said first engagement member.

5. A parking lock system according to claim 4, wherein:
    said pivotable plate is pivotably supported on a bracket member rollable substantially integrally with said front vehicle body.

6. A parking lock system according to claim 2, wherein:
    said pivotable mechanism comprises a linkage capable of a toggle movement in operative cooperation with said second engagement member.

7. A parking lock system according to claim 6, wherein:
    said second engagement member comprises a pivotable plate having on one side thereof a shoulder portion abuttable with said linkage and on the opposite side thereof a pawl portion engageable with said first engagement member.

8. A parking lock system according to claim 7, wherein:
    said pivotable plate is pivotably supported on a bracket member rollable substantially integrally with said front vehicle body.

9. A parking lock system according to claim 8, wherein:
    said linkage comprises a first link pivotably fixed at one end thereof to said pivotable plate and a second link pivotably connected at one end thereof with the other end of said first link, pivotably fixed at an intermediate portion thereof to said bracket member, and operatively connected at the other end thereof with said spring member.

10. A parking lock system according to claim 9, wherein:

said other end of said first link is abuttable against said shoulder portion of said pivotable plate.

11. A parking lock system according to claim 10, wherein:
said first and second links are arranged so as to be alignable along a substantially straight line when said first link is abutted against said shoulder portion of said pivotable plate.

12. A parking lock system according to claim 1, wherein:
said second engagement member comprises a pivotable member having a pivot axis extending in substantially the same direction as said rolling shaft, such that said second engagement member is pivotable substantially in the radial direction of said rolling shaft.

13. A parking lock system according to claim 1, wherein:
said second engagement member comprises a pivotable member having a pivot axis extending substantially perpendicular to the axis of said rolling shaft, such that said second engagement member is pivotable substantially in the axial direction of said rolling shaft.

14. A parking lock system according to claim 1, wherein:
said front and rear vehicle bodies are interconnected through a swing joint swingably connected at one end thereof with said front vehicle body and rotatably fitted at the other end thereof on said rolling shaft.

15. A parking lock system according to claim 14, wherein:
said first and second engagement members and said engagement assuring means are commonly accommodated in a recess formed in said swing joint; and
said cable member is partially provided through said recess.

16. A parking lock system according to claim 15, wherein:
said swing joint has a removable cover member adapted to close said recess.

17. A parking lock system according to claim 15, wherein:
said second engagement member is pivotably fixed to a bracket member;
said bracket member is secured to said swing joint with at least one bolt applied through a bolt hole formed in said bracket member; and
said bolt includes a stem which is smaller in diameter than said bolt hole, and a polygonal head which is eccentric with respect to the center of said stem.

18. A parking lock system for a three-wheeled vehicle having front and rear vehicle bodies interconnected so as to be capable of rolling relative to each other, comprising:
a first engagement member mounted on one of said vehicle bodies so as to be rollable substantially integrally therewith;
a second engagement member provided for the other of said vehicle bodies so as to be rollable substantially integrally therewith and engageable with said first engagement member in at least one predetermined relative position only, said engagement causing said relative rolling to be locked;
a wheel lock mechanism for locking rotation of at least one road wheel of said vehicle;
a cable member adapted to be pulled to actuate both said second engagement member and said wheel lock mechanism;
engagement assuring means for assuring said engagement between said first and second engagement members while said cable member is pulled;
said front and rear vehicle bodies being interconnected through a rolling shaft secured at one end thereof to said rear vehicle body and rotatably fitted at the other end thereof in said front vehicle body;
said first engagement member being secured to said rolling shaft; and
said front and rear vehicle bodies being interconnected through a swing joint swingably connected at one end thereof with said front vehicle body and rotatably fitted at the other end thereof on said rolling shaft.

19. A parking lock system according to claim 18, wherein:
said first and second engagement members and said engagement assuring means are commonly accommodated in a recess formed in said swing joint; and
said cable member is partially provided through said recess.

20. A parking lock system according to claim 19, wherein:
said swing joint has a removable cover member adapted to close said recess.

21. A parking lock system according to claim 19, wherein:
said second engagement member is pivotably fixed to a bracket member;
said bracket member is secured to said swing joint with at least one bolt applied through a bolt hole formed in said bracket member; and
said bolt includes a stem which is smaller in diameter than said bolt hole, and a polygonal head which is eccentric with respect to the center of said stem.

* * * * *